BEST AVAILABLE COPY
H. A. WILLS.
Machine for Finishing Hoseshoe Nails.
No. 6,712. Reissued Oct. 19, 1875.
Fig. 1.
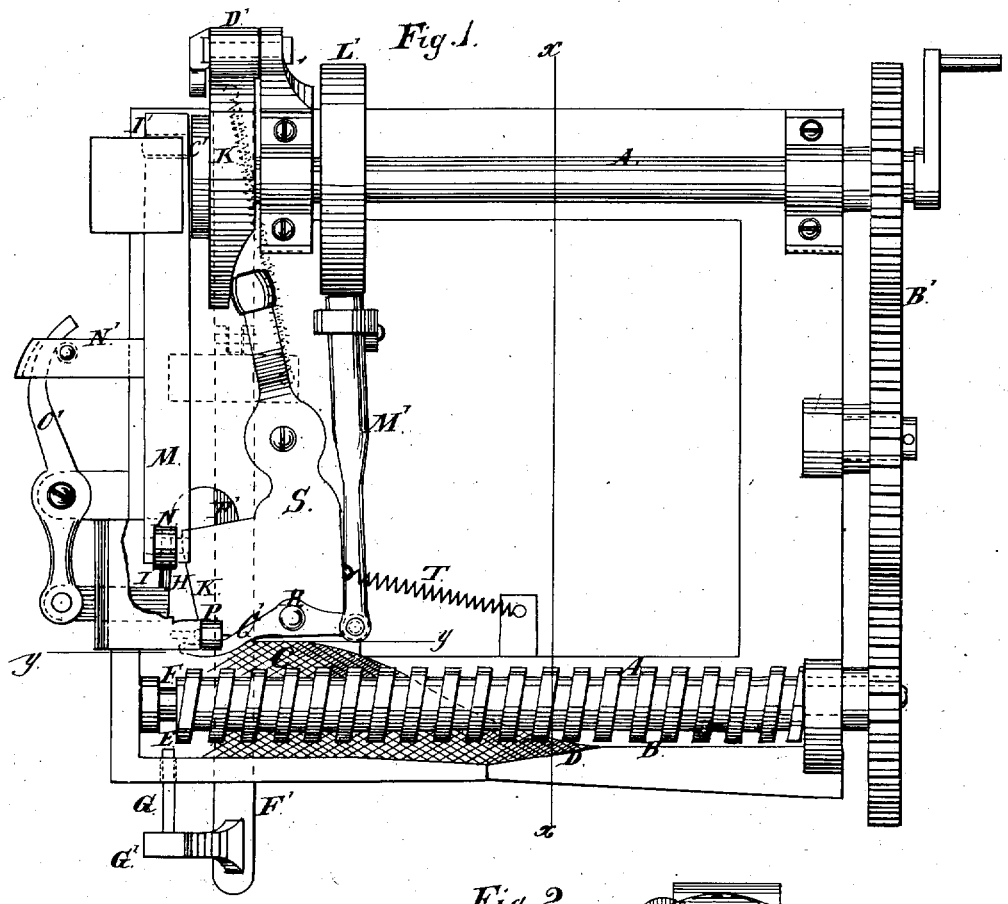
Fig. 2.
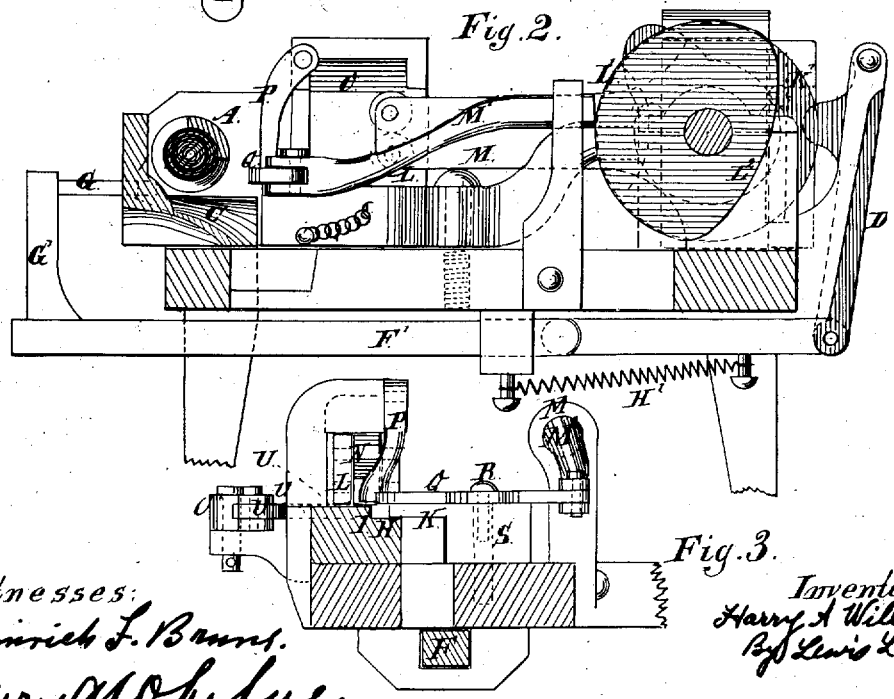
Fig. 3.
Witnesses:
Heinrich L. Brunt.
Henry C. Whitney
Inventor:
Harry A. Wills
By Lewis L. Coburn
Atty.

UNITED STATES PATENT OFFICE.

HARRY A. WILLS, OF VERGENNES, VERMONT, ASSIGNOR TO JULIA A. WILLS AND LUCY S. KINGSLAND.

IMPROVEMENT IN MACHINES FOR FINISHING HORSESHOE-NAILS.

(Specification forming part of Letters Patent No. 122,876, dated January 16, 1872; reissue No. 5,249, dated January 21, 1873; reissue No. 6,712, dated October 19, 1875; application filed August 11, 1874.

DIVISION A.

*To all whom it may concern:*

Be it known that I, HARRY A. WILLS, of Vergennes, in the county of Addison and State of Vermont, have invented a new and Improved Machine for Cold-Rolling Horseshoe-Nails, of which the following is a specification:

My invention consists in certain improvements in a machine for cold-rolling horseshoe-nails after they have been formed, to harden and finish them, as will more fully hereinafter appear.

In the accompanying drawings, which form a part of this specification, Figure 1 is a plan view of my improved machine with a part broken away; and Fig. 2 is a transverse sectional elevation of the same, taken on the line *x x*, Fig. 1. Fig. 3 is a cross-section through *y y*, Fig. 1.

Similar letters of reference indicate corresponding parts.

A represents a screw-feeder with a vertical guide at B, such as have been used before for feeding nails point downward, the nails being placed in the grooves of the screw and between it and the side B, and held against falling through by the heads. Now, in order to utilize this kind of feeding apparatus for delivering the nails horizontally to horizontal dies I provide a scroll-shaped or approximately scroll-shaped lip, C, upon the guide B under the screw, gradually turning from a vertical line, where the nail first comes against it at D, to a horizontal position at E, where the screw-thread ends and ceases to act on it, leaving it under a groove, F, in the screw for allowing the head to pass under it; or a channel may be formed in the lip for the nail to drop into instead of the groove. G is a pusher, which is arranged to work through the vertical part of the guide, to come against the head of the nail when left on the horizontal part of the lip C, and push it on a bed-die or former, H, between a fixed die, I, and a movable one, K, which close laterally against the narrow sides of the nail to hold it on the bed-die for being rolled; also for pressing and smoothing the sides. L is the roller-die, which is in contact at its upper periphery with the guide-roller N, both of which—the roller-die L and its guide-roller N—are mounted at the side and one end of the reciprocating bar M, which works under the stationary guide-former O, the face of which is the reverse of the upper side of the nail, and causes the roller-die to act with requisite pressure on all parts thereof, beginning at the highest part of the head and rolling down to the point.

It will readily be understood that the roller N is necessary to the working of the roller L, because they must turn in opposite directions, the upper one being rotated by its contact above with the resistance or former O, and the other by its contact below with the nail upon the bed-plate. The two rollers being in contact themselves a powerful pressure is exerted from the former O down through the bodies of both rollers to the nail upon the bed-plate. This roller-die is pushed forward to the left, Fig. 2, before the nail is pushed forward, point foremost, under it by the pusher G, until the highest part of the oblique side of the head comes against it.

P is the head-holder, which consists of a short bar of steel pivoted to the stock of the former O, and projecting downward to a point above the head of the nail to prevent it from being forced upward by the tendency of the nail to bend under the action of the roller-die. This holder, being fixed on a pivot, Q, at the upper end, is pushed forward toward the screw A by the end of the bar M at the time the nail is being received, or just before, so that the lower end is elevated enough to allow the head of the nail to pass under it freely; but as soon as the roller-die moves back to act on the nail the said lower end is brought on the nail-head by the vibrating arm Q, pivoted at R to the movable stock S of the movable die K, and holds the nail from bending upward until the action of the roller-die ceases and it passes off the point; then the die K is withdrawn by a spring, T, releasing the nail both from it and from the head-holder P, and it is discharged by a pusher, U.

The object of thus forming the nail by pressure between the moving roller L and a stationary surface—the bed-plate—rather than between a pair of rollers is, the convenience and ease of manipulating the nail, and the surety of an accurate and certain action; but, also, and this is the chief object, because the moving roller L, pressing the nail against the stationary bed-plate, acts to compact the surface of the metal of the nail, upon one side—the side with which the roller is in contact—making said surface hard, which stiffens the nail sufficiently to allow of its being easily driven, while the other surface, upon the side lying against the bed-plate, is left soft. The point being beveled upon the soft side, the nail will drive easily, and will bend for clinching without breaking, the bend being made toward the hard side of the nail, because the soft side will yield or give in the strain of bending. If the nail were hardened or compacted on both sides by being passed between a pair of rollers, or by other similar means, it would be stiffened, it is true, and formed, but it would not clinch so well.

These devices may be operated by any suitable or approved arrangement of driving-gear; but in this example I have represented a driving-shaft at A′, with a train of gears, B′, for working the feed-screw; a cam, C′, lever D′, jointed connecting-bar F′, stud G′, and a spring, H′, for working the pusher; a crank-pin, I′, and a yoke for it in the end of the reciprocating roller die bar M for working it; a cam, K′, and the spring T for working the movable clamping die-stock S; a cam, $L^1$, push-bar M′, and vibrating bar Q for moving the head-holder P back over the head of the nail; and a slotted stud, N′, on the bar M and the curved lever O′ for working the pusher, all being arranged as shown in the drawing. The cam $L^1$ is so adjusted to the crank which actuates the roller-die bar M that the lower part $L^2$ passes the end of push-bar M′ at the time the roller-die is in the forward position over the bed-die, allowing the said bar M′ to recede and allow the head-holder P to be moved forward by said die-bar to allow the nail to be pushed in, and the cam C′ for actuating the pusher is arranged in such relation to the said crank-pin that the pusher G is actuated to push the nail under the roller-die while the latter is in the said forward position.

I am aware of the patent granted to C. O. Crosby, November 1, 1853, No. 10,180, and disclaim all invention in the combination of mechanism for transferring the pins from a vertical to a horizontal position therein included and shown.

Having thus described my invention, I claim as new and desire to secure by Letters Patent—

1. The combination, as herein described and shown, of the scroll-shaped guide B C and feed-screw, substantially as specified.

2. The combination of the pusher G with the roller and bed dies, the said pusher and roller-die and the operating devices therefor being arranged in such relation that the nail will be pushed forward when the roller-die is over the bed-die, substantially in the manner herein described.

3. The combination of the head-holder with the bed-die and roller-die, substantially as specified.

HARRY A. WILLS.

Witnesses:

HEINRICH F. BRUNS,

LEWIS L. COBURN.